United States Patent
Kikuchi et al.

(10) Patent No.: US 9,420,165 B2
(45) Date of Patent: Aug. 16, 2016

(54) FOCUS ADJUSTMENT APPARATUS, CAMERA SYSTEM, AND FOCUS ADJUSTMENT METHOD

(71) Applicant: Olympus Corporation, Shibuya-ku, Tokyo (JP)

(72) Inventors: Tetsuo Kikuchi, Hachioji (JP); Takeshi Kindaichi, Hachioji (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 14/961,335

(22) Filed: Dec. 7, 2015

(65) Prior Publication Data

US 2016/0088218 A1    Mar. 24, 2016

Related U.S. Application Data

(63) Continuation of application No. PCT/JP2014/066521, filed on Jun. 23, 2014.

(30) Foreign Application Priority Data

Jun. 27, 2013    (JP) .................................. 2013-134614

(51) Int. Cl.
*H04N 5/232* (2006.01)
*G02B 7/28* (2006.01)
(Continued)

(52) U.S. Cl.
CPC .............. *H04N 5/23212* (2013.01); *G02B 7/28* (2013.01); *G02B 7/34* (2013.01); *G03B 13/36* (2013.01); *G03B 17/14* (2013.01); *H04N 5/23209* (2013.01)

(58) Field of Classification Search
CPC ............ G02B 7/28; G02B 7/34; G03B 13/36; G03B 17/14; H04N 5/23209; H04N 5/23212
See application file for complete search history.

(56) References Cited

U.S. PATENT DOCUMENTS 8,588,599 B2 * 11/2013 Inoue ..................... G02B 7/365
348/354
2011/0096171 A1 * 4/2011 Kimura .................... G02B 7/34
348/187

(Continued)

FOREIGN PATENT DOCUMENTS

JP     02-077006      3/1990
JP     2012-14135     7/2012

(Continued)

OTHER PUBLICATIONS

Office Action to Japanese Patent Application No. 2013-134614, mailed on Aug. 5, 2015, (2 pgs.) with translation (3 pgs.).

(Continued)

*Primary Examiner* — Amy Hsu
(74) *Attorney, Agent, or Firm* — John C. Pokotylo; Straub & Pokotylo

(57) ABSTRACT

A focus adjustment apparatus comprising a focus detection unit to detect image phase difference information using a light flux having passed through a photographic optical system including a focus lens, and a focus adjustment unit converts first image phase difference information detected by the focus detection unit into a defocus amount using a conversion coefficient and causes the focus detection unit to detect second image phase difference information after having moved the focus lens according to the defocus amount, and corrects the conversion coefficient according to the second image phase difference information and causes a storage unit to store the corrected conversion coefficient.

11 Claims, 9 Drawing Sheets

(51) Int. Cl.
*G02B 7/34* (2006.01)
*G03B 13/36* (2006.01)
*G03B 17/14* (2006.01)

(56) References Cited

U.S. PATENT DOCUMENTS

| | | | | |
|---|---|---|---|---|
| 2012/0007997 A1* | 1/2012 | Oikawa | ............. | G03B 13/36 348/208.6 |
| 2012/0162493 A1* | 6/2012 | Wakamiya | ........... | H04N 5/3696 348/345 |
| 2014/0285707 A1* | 9/2014 | Ogawa | ............... | H04N 5/23212 348/353 |
| 2015/0229830 A1* | 8/2015 | Mizukami | .......... | H04N 5/23212 348/346 |

FOREIGN PATENT DOCUMENTS

| | | |
|---|---|---|
| JP | 2012-220925 | 11/2012 |
| JP | 2013-054120 | 3/2013 |

OTHER PUBLICATIONS

International Search Report to International Application No. PCT/JP2014/066521, mailed on Sep. 22, 2014 (1 pg.) with translation (1 pg.).

* cited by examiner

FOCUS ADJUSTMENT APPARATUS, CAMERA SYSTEM, AND FOCUS ADJUSTMENT METHOD

CROSS-REFERENCE TO RELATED APPLICATIONS

This application is a Continuation Application of PCT Application No. PCT/JP2014/066521, filed on Jun. 23, 2014 and based upon and claiming the benefit of priority from prior Japanese Patent Application No. 2013-134614, filed on Jun. 27, 2013, the entire contents of all of which are incorporated herein by reference.

BACKGROUND OF THE INVENTION

1. Field of the Invention

The present invention relates to a focus adjustment apparatus, a camera system, and a focus adjustment method to perform focus adjustment by a phase difference AF method.

2. Description of the Related Art

Conventionally, a phase difference AF method has been used for focus adjustment in a camera system and the like. This phase difference AF method obtains a two-image interval value (also called image phase difference information), and converts this two-image interval value into a defocus amount using a conversion coefficient (also called AF sensitivity). This conversion coefficient varies because of individual variation in an imaging element, and individual variation in a photographic lens, in the case of a so-called image plane phase difference AF method. For the individual variation in the imaging element, the influence of variation in the manufacturing quality of an on-chip micro-lens for pupil division is large. Further, for the individual variation in the photographic lens, the influence of variation in the manufacturing quality of the opening diameter of a diaphragm is large. An imaging apparatus to correct such a conversion coefficient is described in Japanese Patent Laid-Open No. 2012-220925 (hereafter referred to as "Patent Literature 1"). This Patent Literature 1 discloses that, when the two-image interval value is obtained from image data which is calculated by the addition of pixel data sets obtained from a focus detection pixel a plurality of times with lapse of time and is converted into a defocus amount, the conversion coefficient is corrected and the defocus amount is calculated in order to cope with the optical change of the photographic lens during this lapse of time.

Above Patent Literature 1 discloses that the conversion coefficient relating to the temporal change of an optical system is corrected. However, it is not disclosed that the variation of the conversion coefficient caused by the individual variation in the imaging element or an interchangeable lens is corrected. In the correction of the variation in the conversion coefficient, although adjustment can be performed for absorbing the influence of the individual variation in the imaging element, it is very difficult to adjust variation corresponding to the individual variation in the interchangeable lens. Further, it is also difficult to adjust a variation component of mutual influence between the individual variation in the imaging element and the individual variation in the interchangeable lens.

For example, FIG. 2 shows the two-image interval by the horizontal axis and the defocus amount by the vertical axis, and L1 to L3 are conversion coefficient curves which are assumed to vary caused by the individual variation in the imaging element or the interchangeable lens. Here, when it is assumed that L3 shows a true conversion coefficient curve in the case that the two-image interval value is X and L1 shows a currently used conversion coefficient curve, the defocus amount becomes y and a value smaller than a true defocus amount y' is calculated. As a result, lens drive has an insufficient state, and it is necessary to detect the two-image interval value and perform the lens drive (also called LD) again.

Accordingly, the number of lens drive times becomes large and AF time becomes long. Further, when the AF sensitivity is shifted, it is not possible to accurately detect the defocus amount during continuous AF or continuous shooting AF, and therefore the moving object predicting performance becomes degraded.

SUMMARY OF THE INVENTION

The present invention has been achieved in view of such a situation, and aims to provide a focus adjustment apparatus, a camera system, and a focus adjustment method, capable of performing correction so as to obtain an accurate conversion coefficient for an individual focus adjustment apparatus.

A focus adjustment apparatus according to a first aspect of the present invention includes: a focus detection unit to detect image phase difference information using a light flux having passed through a photographic optical system including a focus lens; a storage unit to store a conversion coefficient for converting the image phase difference information into a defocus amount; and a focus adjustment unit to convert the image phase difference information into the defocus amount using the conversion coefficient and to perform focus adjustment by moving the focus lens according to the defocus amount, wherein the focus adjustment unit converts first image phase difference information detected by the focus detection unit into a first defocus amount using the conversion coefficient and causes the focus detection unit to detect second image phase difference information after having moved the focus lens according to the first defocus amount, and converts the second image phase difference information into a second defocus amount using the conversion coefficient, and corrects the conversion coefficient according to the first defocus amount and the second image phase difference information and causes the storage unit to store the corrected conversion coefficient.

A camera system according to a second aspect of the present invention includes an interchangeable lens having a photographic optical system and a camera main body to which the interchangeable lens can be attached, the interchangeable lens including: a lens control unit to control movement of a focus lens included in the photographic optical system; a lens storage unit to store identification information specific to the interchangeable lens; and a lens communication unit to communicate with the camera main body, and the camera main body including: a focus detection unit to detect image phase difference information using a light flux having passed through the photographic optical system, a main body storage unit to store a conversion coefficient for converting the image phase difference information into a defocus amount in association with the identification information of the interchangeable lens, a focus adjustment unit to select a conversion coefficient stored in the main body storage unit according to the identification information of the interchangeable lens obtained from the lens storage unit via the lens communication unit, to convert the image phase difference information into the defocus amount using the conversion coefficient, and to perform focus adjustment by causing the lens control unit to move the focus lens according to the defocus amount, wherein the focus adjustment unit converts first image phase difference information detected by the focus detection unit into a first defocus amount using the conversion coefficient, and causes the focus detection unit to detect second image phase difference information after having moved the focus lens according to the first defocus amount, converts the second image phase difference information into a second defocus amount using the conversion coefficient, and corrects the conversion coefficient according to the first defocus amount and the second defocus amount and causes the main body storage unit to store the corrected conversion coefficient.

A focus adjustment method according to a third aspect of the present invention is a focus adjustment method of a focus adjustment apparatus that detects image phase difference information using a light flux having passed through a photographic optical system including a focus lens, converts the image phase difference information into a defocus amount using a conversion coefficient for converting the image phase difference information into the defocus amount, and performs focus adjustment by moving the focus lens according to the defocus amount, a focus adjustment method comprising: detecting first image phase difference information; converting the first image phase difference information into a first defocus amount using the conversion coefficient; detecting second image phase difference information after having moved the focus lens according to the first defocus amount; converting the second image phase difference information into a second defocus amount using the conversion coefficient, and correcting the conversion coefficient according to the first defocus amount and the second defocus amount.

DETAILED DESCRIPTION OF THE PREFERRED EMBODIMENTS

Figure 1:
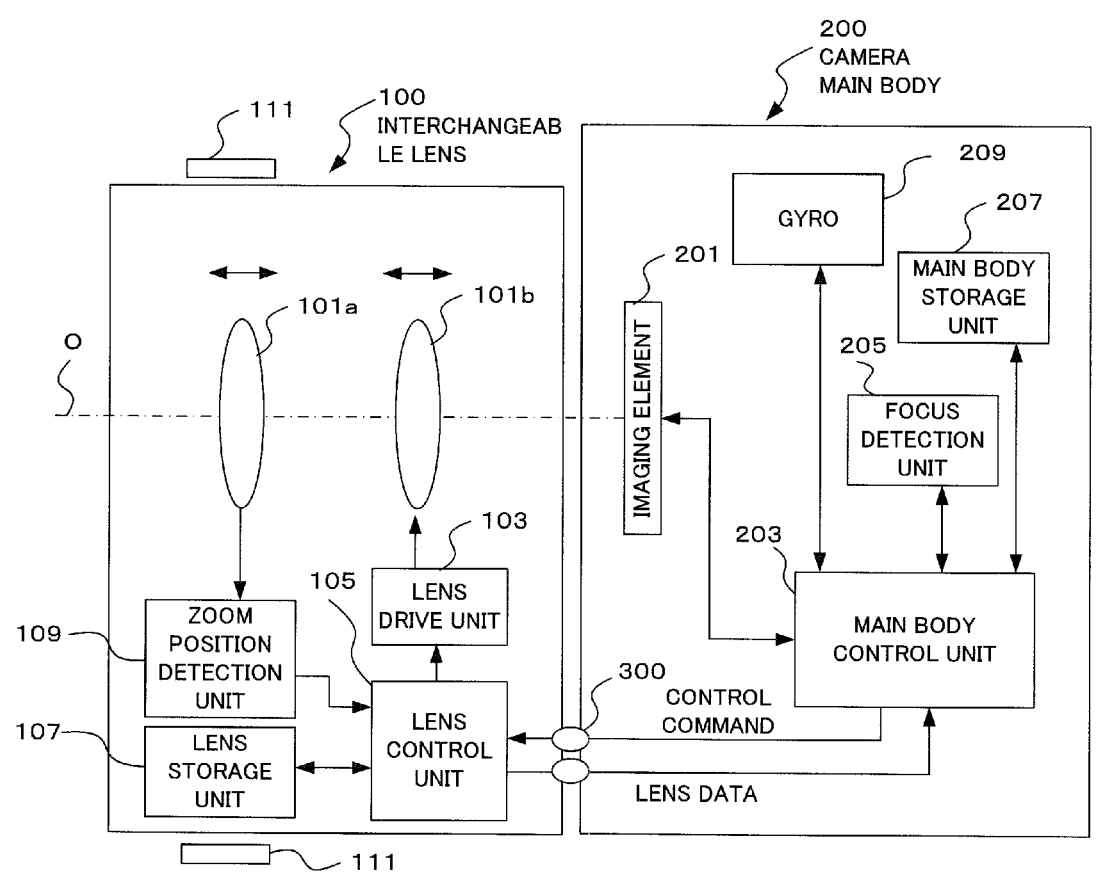
FIG. 1 is a block diagram mainly showing an electrical configuration of a camera system according to an embodiment of the present invention.

Hereinafter, a preferable embodiment will be explained by the use of a camera system to which the present invention is applied, according to the drawings. FIG. 1 is a block diagram mainly showing an electrical configuration of a camera system according to an embodiment of the present invention. This camera system includes an interchangeable lens 100 provided with a photographic optical system having a variable focal length and a camera main body 200 to which the interchangeable lens is attached detachably. Note that, while the interchangeable lens 100 is attached detachably to the camera main body 200 in the present embodiment, the present invention is not limited to this case and may be a camera system in which a photographic lens and a camera main body are integrally configured.

Photographic lenses 101a and 101b (101 when called generally) are disposed configuring the photographic optical system within the interchangeable lens 100. The photographic lens 101 includes a focus lens. This photographic lens 101 can be moved along an optical axis O direction by a lens drive unit 103, respectively. The positions of the photographic lenses 101a and 101b are changed by this lens drive unit 103.

A zoom ring 111 is disposed rotatably in the circumference of the interchangeable lens 100, the positions of the photographic lenses 101a and 101b are changed and thereby the focal length is changed when a user rotates the zoom ring 111 manually.

The lens drive unit 103 includes an actuator such as a stepping motor and a DC motor, and moves the photographic lenses 101a and 101b by the actuator. The lens drive unit 103 is connected to a lens control unit 105, and the lens drive unit 103 is controlled by this lens control unit 105. The lens control unit 105 includes a CPU and a circuit such as an ASIC, and performs the control of the interchangeable lens 100 according to a program stored in a lens storage unit 107. Further, the lens control unit 105 controls the movement of the focus lens included in the photographic lens 101 (photographic optical system) via the lens drive unit 103. The lens drive unit 103 detects the position of the focus lens according to a drive amount or the like of the actuator, and outputs the position to the lens control unit 105. In this control of the interchangeable lens 100, the lens control unit 105 communicates with a main body control unit 203 in the camera main body 200 via a communication terminal 300, and performs the control according to a control instruction from the camera main body 200. The lens control unit 105 also performs a function as the lens communication unit to communicate with the camera main body 200.

The lens storage unit 107 includes a rewritable non-volatile memory, and is connected to the lens control unit 105. The storage unit 107 stores various adjustment values of the interchangeable lenses 100 in addition to the above control program. Further, the lens storage unit 107 stores identification information specific to the interchangeable lens 100.

A zoom position detection unit 109 is connected to the lens control unit 105, detects a zoom position corresponding to the focal length of the photographic optical system from the positions of the photographic lenses 101a and 101b, and outputs the zoom position to the lens control unit 105. The lens control unit 105 transmits this input zoom position to the camera main body 200 via the lens communication unit. Note that, while the lens drive unit 103 detects the focus lens position in the present embodiment, the zoom position detection unit 109 may detect the focus lens position and output the position to the lens control unit 105.

An imaging element 201, the main body control unit 203, a focus detection unit 205, a main body storage unit 207, and a gyro 209 are disposed within the camera main body 200 to which the interchangeable lens 100 can be attached. The imaging element 201 is disposed at a position on the optical axis O of the photographic lens 101 where a subject image is formed, photoelectrically-converts the subject image, and outputs image data to the main body control unit 203. Further, in addition to imaging pixels, the imaging element 201 has a focus detection pixel disposed on a pixel plane for receiving alight flux obtained by pupil-dividing a light flux having passed through the photographic optical system to detect image phase difference information.

The focus detection unit 205 detects the image phase difference information using the light flux having passed through the photographic optical system including the focus lens. Specifically, the focus detection pixel of the imaging element 201 receives the light flux obtained by pupil-dividing the light flux having passed through the photographic system, and outputs a focus detection signal according to this light flux. The focus detection unit 205 inputs the focus detection signal from the imaging element 201, calculates the image phase difference information (two-image interval value), and outputs it to the main body control unit 203.

Further, the focus detection unit 205 calculates a degree of reliability which indicates the reliability of the image phase difference information. The degree of reliability is determined, for example, by the use of information whether the contrast information of a pixel signal exhibits a value smaller than a predetermined value or not, or the gradient of a two-image correlation value around a minimum value of the two-image correlation value. Further, the focus detection unit 205 has a plurality of range-finding areas in the view of the photographic optical system, and detects the image phase difference information corresponding to each of the range-finding areas.

The main body storage unit 207 includes a rewritable nonvolatile memory, is connected to the main body control unit 203, and stores a control program of the main body control unit 203 and the conversion coefficient to convert the phase difference information into the defocus amount in association with the identification information of the interchangeable lens 100.

The gyro 209 is a sensor to detect vibration or the like applied to the camera main body 200, and a detection signal is output to the main body control unit 203. The main body control unit 203 can determine whether the posture of the camera is stable or not according to the detection signal from the gyro 209. Note that, not limited to the gyro, another sensor may be used if it can be determined whether the posture of the camera is stable or not.

The main body control unit 203 includes a control unit such as a CPU, and performs the control of the camera main body 200 according to a program stored in the main body storage unit 207 and also performs the control of the whole camera system by the communication with the lens control unit 105. The main body control unit 203 and the lens control unit 105 exchange a control command and lens data such as the zoom lens position via the communication terminal 300.

Further, the main body control unit 203 converts the image phase difference information into the defocus amount using the conversion coefficient stored in the main body storage unit 207, and performs a function as a focus adjustment unit which performs the focus adjustment by moving the focus lens of the photographic optical system according to this defocus amount.

Further, this focus adjustment unit selects a conversion coefficient stored in the main body storage unit 207 according to the identification information of the interchangeable lens 100 obtained from the lens storage unit 107 via the lens communication unit (the function thereof is performed by the lens control unit 105), converts the image phase difference information into the defocus amount using the conversion coefficient, and performs the focus adjustment by causing the lens control unit 105 to move the focus lens in the photographic lens 101 according to this defocus amount. Further, this focus adjustment unit obtains the position of the focus lens from the focus lens position detection unit (the function thereof is performed by the zoom position detection unit 109) via the communication unit, and corrects the conversion coefficient according to the position of the focus lens.

Further, this focus adjustment unit converts first image phase difference information detected by the focus detection unit 205 into the defocus amount using the conversion coefficient, causes the focus detection unit 205 to detect a second image phase difference information after having moved the focus lens according to this defocus amount, corrects the conversion coefficient according to the second image phase difference information, and causes the main body storage unit 207 to store the corrected conversion coefficient. That is, in the present embodiment, even when an individual camera system has a variation, the conversion coefficient is corrected by the use of a learning function so as to have a value suitable for the individual interchangeable lens 100 and the camera main body 200. This learning function will be described below by the use of FIG. 9 and FIG. 10.

Figure 2:
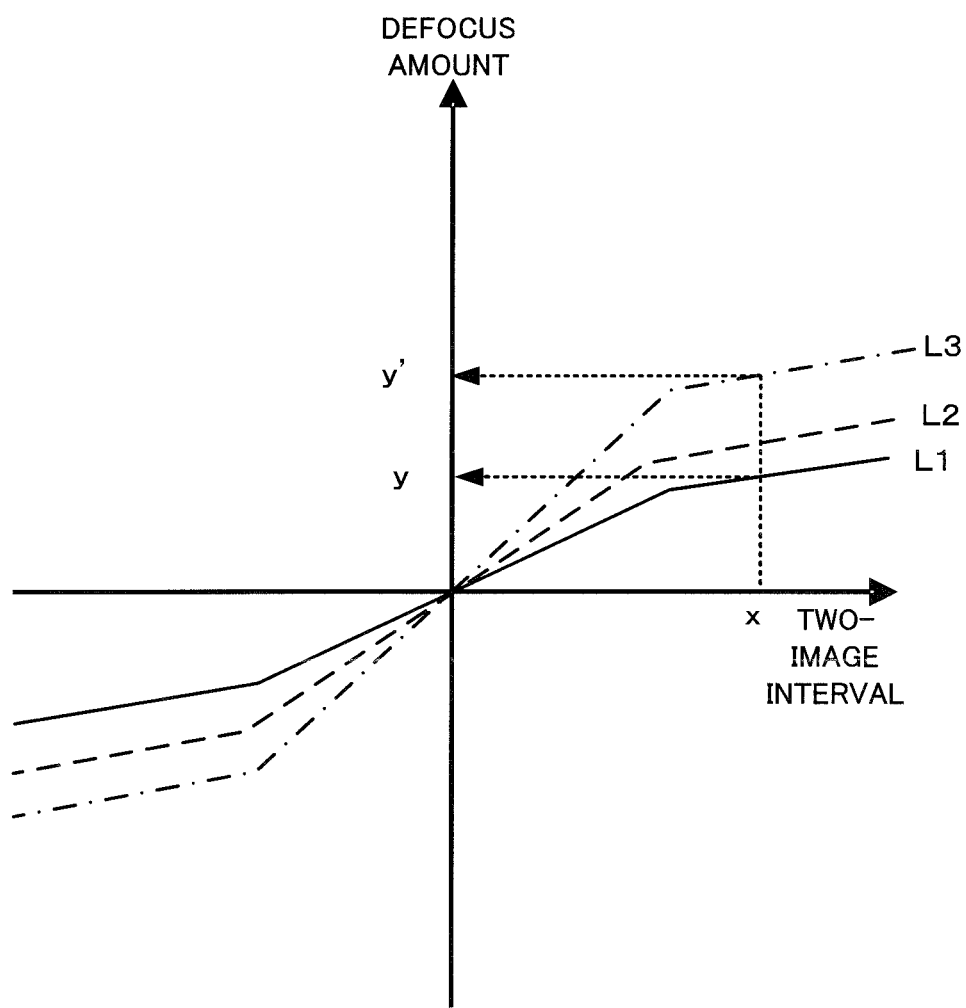
FIG. 2 is a graph showing a conversion relationship between a two-image interval value and a defocus amount in a camera system according to an embodiment of the present invention.

Next, by the use of FIG. 2 to FIG. 7, there will be explained how to correct the conversion coefficient (AF sensitivity) by the learning. In FIG. 2, the horizontal axis indicates the two-image interval value detected by the focus detection unit 205, and the vertical axis indicates the defocus amount obtained by the multiplication of the two-image interval value by the conversion coefficient. Further, bent curves L1 to L3 are conversion coefficient curves (AF sensitivity curves), and, among these curves, conversion coefficient curve L1 is assumed to indicate a lower limit value of the conversion coefficient, conversion coefficient curve L2 is assumed to indicate a medium value, and conversion coefficient curve L3 is assumed to indicate an upper limit value, as an example. The lower limit value and the upper limit value are limit values of variation, and conversion coefficient curve L1 and conversion coefficient curve L3 indicate the lower limit value and the upper limit value for a supposed conversion coefficient and are preliminarily stored in the lens storage unit 107 at the stage of factory shipment. By the use of these conversion coefficient curves L1 and L2, the present embodiment obtains a true conversion coefficient curve by learning.

Here, in the example shown in FIG. 2, x is assumed to be calculated as a two-image interval value in the focus detection unit 205. Further, a true conversion coefficient in this camera system is assumed to be shown by conversion coefficient curve L3 which indicates the upper limit value, and the learning of the conversion coefficient is assumed to be started from conversion coefficient curve L1 which indicates the lower limit value. In the case of a two-image interval value x, a defocus amount y is obtained by the use of conversion coefficient curve L1, and a defocus amount y' is obtained by the use of conversion coefficient curve L3 which is the true conversion coefficient curve of this case. In this case, since the defocus amount is smaller than the true value (y'), the drive amount of the focus lens is small and drive shortage is caused. Therefore, since the two-image interval value is obtained again, the defocus amount and the drive amount are obtained from this two-image interval value, and then the lens drive is performed, the number of lens drive times is increased and the AF time becomes long.

Therefore, the present embodiment is configured to detect the excess or deficiency of the AF sensitivity (conversion coefficient) by calculating a difference of defocus amount detection results between before and after the drive of the focus lens using defocus amounts in actual use, store a true AF sensitivity (conversion coefficient) in consideration of the variation, and, after that, use the defocus amount using the stored AF sensitivity. Accordingly, in the present embodiment, a certain time is required for the detection of the true AF sensitivity (conversion coefficient) when an interchangeable lens camera system is used for the first time, or when an interchangeable lens which has not been used so far is attached. After the true AF sensitivity (conversion coefficient) is stored, however, it becomes possible to perform the AF control quickly.

Figure 3:
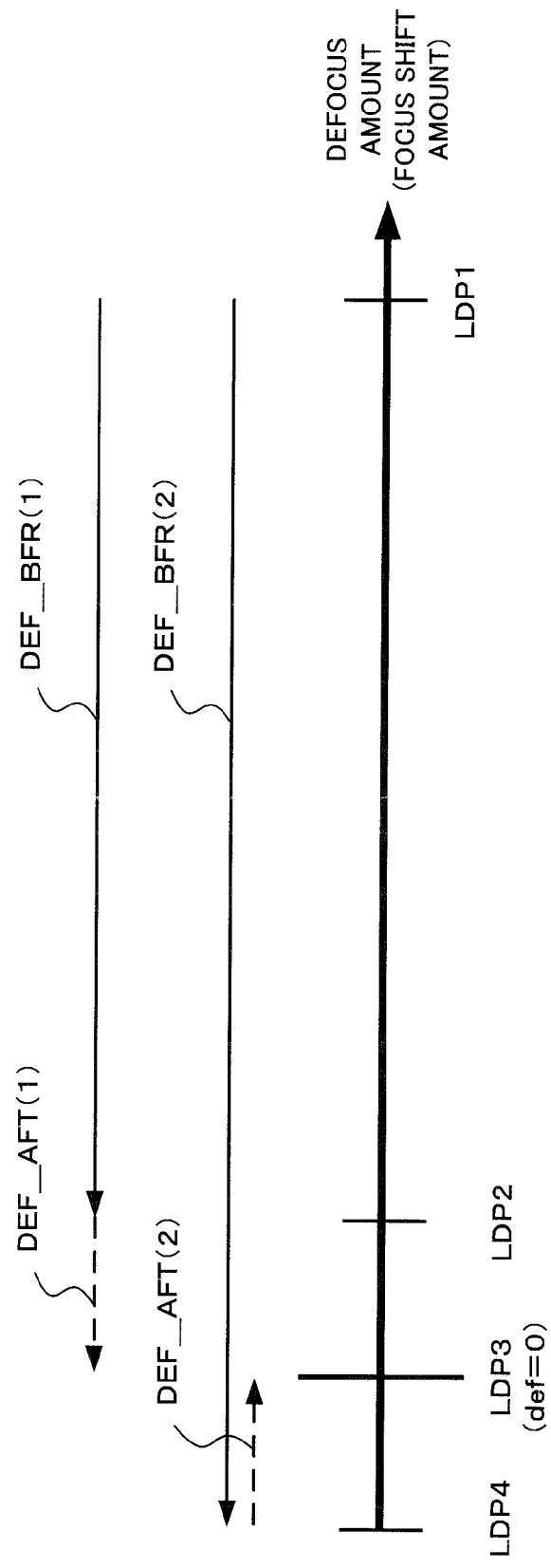
FIG. 3 is a conceptual diagram explaining the detection of excess or deficiency of a conversion coefficient in a camera system according to an embodiment of the present invention.

Next, by the use of FIG. 3, the detection of excess or deficiency of the AF sensitivity will be explained. In FIG. 3, LDP1 of the horizontal axis indicates a pre-drive position, LDP2 indicates a focusing position calculated before the drive (case of deficient sensitivity), LDP3 indicates a true focusing position (def=0), and LDP4 indicates a focusing position calculated before the drive (case of excessive sensitivity).

Accordingly, when the focusing position calculated before the drive causes a deficient sensitivity, the calculated defocus amount becomes DEF_BFR (1), and, when the focus lens 101 is driven according to this defocus amount, the focus lens 101 is driven to a position LDP2 before the true focusing position LDP3. The defocus shift amount from the true focusing position LDP3, that is, the defocus amount to be corrected by the learning is DEF_AFT (1).

Further, when the focusing position calculated before the drive causes an excessive sensitivity, the calculated defocus amount becomes DEF_BFR(2), and, when the focus lens 101 is driven according to this defocus amount, the focus lens 101 is driven to a position LDP4 passing the true focusing position LDP3. The defocus shift amount from the true focusing position LDP3, that is, the defocus amount to be corrected by the learning is DEF_AFT(2).

The present embodiment is configured to correct the shift amount of DEF_BFR from the true focusing position which is caused by the excessive or deficient sensitivity, by the learning.

Next, by the use of FIG. 4, the learning of the conversion coefficient will be explained for the case that a plurality of AF areas (range-finding area) is provided. Usually, in the range-finding, the imaging plane is divided into a plurality of AF areas, any of the AF areas is selected, and the focusing of the focus lens 101 is performed according to focus information from this AF area. However, since the focus information can be obtained using the image data from the focus detection pixels also in the unselected AF areas, the present embodiment is configured to perform the learning of the conversion coefficient for all the AF areas from which the defocus amounts have been detected.

While the focus lens 101 is driven to the focusing position for the selected AF area, the focus lens 101 will not always come close to the focusing position for the unselected AF area after the drive of the focus lens 101. The example of FIG. 4 shows the case of an AF area for which the focus lens 101 is apart from the focusing position after the drive.

Figure 4:
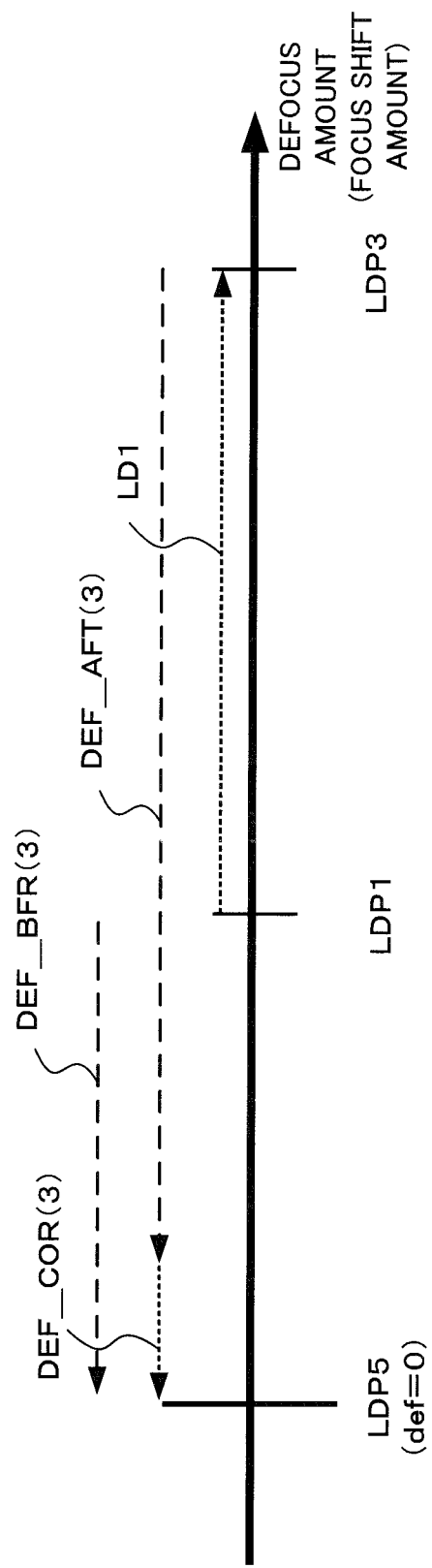
FIG. 4 is a diagram showing control of the detection of excess or deficiency of a conversion coefficient in a camera system according to an embodiment of the present invention.

In FIG. 4, position LDP1 indicates a position before the drive, and position LDP3 indicates a position after the drive which is a position corresponding to the focusing position for a selected AF area. LD1 is a drive amount of the lens and expressed by an amount converted into a defocus amount in FIG. 4. Position LDP5 is a true focusing position for another AF area except the selected AF area. DEF_BFR(3) is a defocus amount of the focus lens 101 in the range finding before the drive of the focus lens (at position LDP1). Further, DEF_AFT (3) is a defocus amount in the range finding after the focus lens is driven to position LDP3. Defocus amount DEF_COR(3) is a defocus shift amount from the true focusing position. The present embodiment corrects this defocus shift amount by the learning.

An amount to be corrected (DEF_COR(3)) can be obtained from following formula (1).

$$\text{Amount to be corrected} = DEF\_AFT - (DEF\_BFR - \text{Lens drive amount}) \quad (1)$$

Here, in FIG. 3, since DEF_BFR−Lens drive amount=0, the amount to be corrected can be expressed as Amount to be corrected=DEF_AFT. Then, as shown below, the sign of the correction amount is changed. When the deficient sensitivity is caused, that is, in the case of lens drive amount LD1<0 (when the lens is driven from right to left in FIG. 4), the sign of the amount to be corrected (DEF_COR(3)) is inverted for causing the amount to be corrected to have a positive value.

Next, by the use of FIG. 5, the conversion coefficient correction will be explained for the case that the lens drive amount is corrected on the interchangeable lens side. The lens drive amount for moving the focus lens to the focusing position is calculated from the defocus amount DEF_BEF for the selected AF area. In an interchangeable lens having a large backlash, however, the backlash correction drive amount is large and sometimes the drive amount is reduced on the interchangeable lens side. Here, the backlash correction drive means drive for correcting a drive amount by an amount corresponding to the backlash when the lens is driven in one direction and then driven in the opposite direction.

This drive amount reduction is performed on the interchangeable lens side because of the following reason. That is, when the lens is moved in a lens drive amount according to the defocus amount calculated on the camera main body side, the lens passes the focusing position (occurrence of overrun), and, in the next lens drive, it is necessary to drive the lens in the opposite direction. In this case, the backlash correction drive needs to be performed and it takes an additional AF time until reaching the focusing position. Accordingly, in order to avoid the backlash correction drive, on the interchangeable lens side, the drive amount is configured to be reduced when the lens drive amount is calculated according to the defocus amount transmitted from the main body side, so as to stop the lens before the focusing position. That is, it is configured such that the drive amount is reduced on the interchangeable lens side and the backlash correction drive does not need to be performed.

In this manner, the lens drive amount is reduced for avoiding the backlash correction drive on the interchangeable lens side. However, when the learning of the conversion coefficient is performed while the amount of the lens drive amount reduction performed on the interchangeable lens side is not fed back to the camera main body side, the lens drive overrun occurs finally. Accordingly, the present embodiment is configured to transmit the drive reduction amount to the camera main body side when the control of driving the lens forward is performed on the interchangeable lens side.

Figure 5:
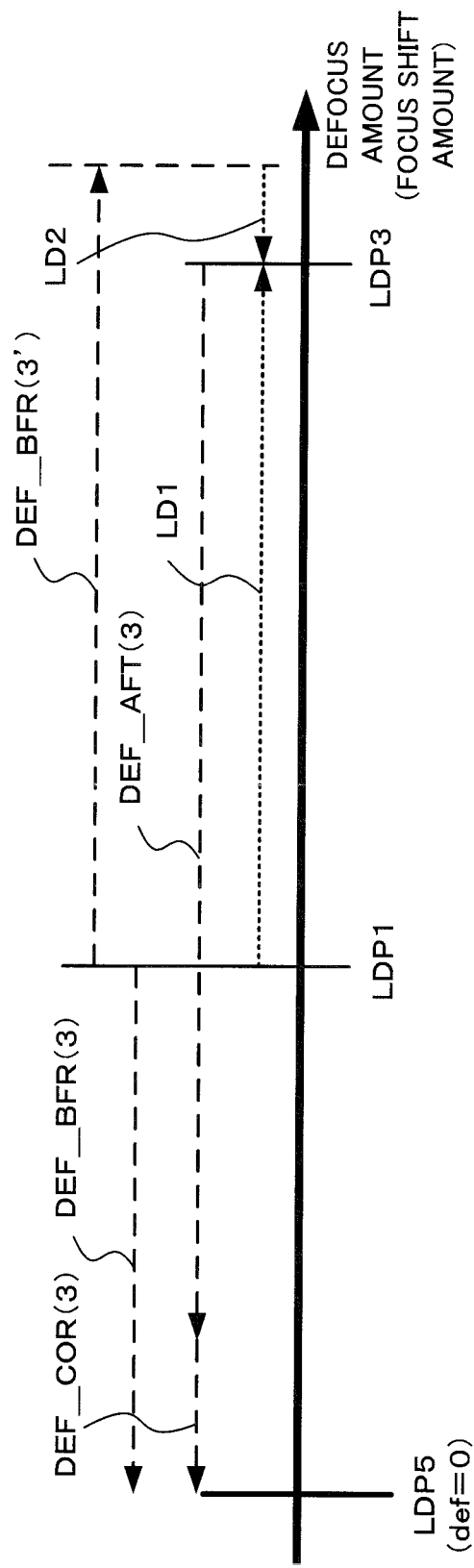
FIG. 5 is a diagram showing control in a case of considering the reduction amount of a lens drive amount in controlling the detection of excess or deficiency of a conversion coefficient in a camera system according to an embodiment of the present invention.

FIG. 5 shows the defocus amount when the lens drive reduction amount is transmitted to the camera main body side. In FIG. 5, position LDP1 indicates a position before the drive, and the defocus amount according to the two-image interval value calculated by the focus detection unit 205 at this position LDP1 is DEF_BFR (3'). As described above, however, the lens drive amount is reduced on the lens barrel side for avoiding the backlash correction drive, and LD2 corresponds to this lens drive reduction amount. Accordingly, the focus lens is driven from position LDP1 to move to position LDP3 by lens drive amount LD1 so as to obtain the focusing for the selected AF area.

In FIG. 5, position LDP5 is a true focusing position for another AF area except the selected AF area. DEF_BFR (3') is a defocus amount in the range finding before the drive of the focus lens (at position LDP1). Further, DEF_AFT (3) is a defocus amount in the range finding after the focus lens is driven to position LDP3. Defocus amount DEF_COR (3) is a defocus shift amount from the true focusing position.

In this manner, in the case shown in FIG. 5, lens drive amount LD1 is calculated by following formula (2).

$$\text{Lens drive amount } LD1 = DEF\_BFR(3') \text{ of selected } AF \text{ area} - \text{Lens drive reduction amount } LD2 \quad (2)$$

Further, the amount to be corrected (DEF_COR(3)) is calculated by following formula (3).

$$\text{Amount to be corrected} = DEF\_AFT(3) - (DEF\_BFR(3) - (DEF\_BFR(3') \text{ of selected } AF \text{ area-Lens drive reduction amount } LD2) \quad (3)$$

Here, the sign of the amount to be corrected is changed as shown below. When a deficient sensitivity is caused, that is, in the case of lens drive amount LD1<0 (when the lens is driven from right to left in FIG. 5), the sign of the amount to be corrected (DEF_COR(3)) is inverted for causing the amount to be corrected to have a positive value.

Next, the calculation of the correction amount will be explained. First, the defocus amount is calculated by following formula (4) by the use of the AF sensitivity (conversion coefficient) and the correction amount.

$$\text{Defocus amount} = \text{Two-image interval value} \times AF \text{ sensitivity value(design value)} \times (100\% - \text{Correction amount})/100\% \quad (4)$$

Here, the two-image interval value is the phase difference information calculated by the focus detection unit 205, and the AF sensitivity value is a design value stored in the main body storage unit 207. For the correction amount, the optimum value is obtained by the learning.

The correction amount is set to be −20% as an initial value not to cause excessive lens drive in the learning. With progress of the learning, the correction amount is updated so that the lens drive is completed at one time.

Further, when the above amount to be corrected has a value as "upper limit value>amount to be corrected>lower limit value", the correction amount is updated. That is, it is assumed that the update of the correction amount is performed except the case that the error amount is not abnormally large and is close to a true value. The update of the correction amount is performed every time the defocus amount is calculated during the learning period, and the correction amount is determined as follows according to the amount to be corrected at that time.

For "Amount to be corrected>0", correction amount+=2%
For "Amount to be corrected<0", correction amount−=2%

Accordingly, when the amount to be corrected, that is, DEF_AFT (2) in the example shown in FIG. 3, or DEF_COR (3) in the examples shown in FIG. 4 and FIG. 5, is larger than zero, the value of correction amount in formula (4) is updated by +2% or −2% when the defocus amount is calculated. Thereby, the correction amount by which the AF sensitivity value (conversion coefficient) is multiplied is updated, and it becomes possible to drive the lens to the true focusing position gradually. Note that "2%" is an exemplary value, and the value may be larger or smaller than "2%".

Note that the above correction amount may be changed according to the degree of reliability of the focus detection.

For example, when the contrast amount of an image within the range-finding area in the detection of DEF_AFT is not smaller than a predetermined threshold value and also the gradient of the two-image correlation value near the minimum value of the correlation value in the detection of DEF_AFT is not smaller than a predetermined threshold value, the degree of reliability is assumed to be high and the correction amount may be set to +4% or −4%. Note that 4% is an exemplary value and the value may be larger or smaller than 4% in consideration of above 2%.

The correction amount obtained by the result of the above learning is stored into the main body storage unit 207 in the camera main body 200 for each lens type. Further, the correction amount varies depending on a zoom state or a focus lens position, and the correction amount is retained individually for each of the values thereof.

Figure 6:
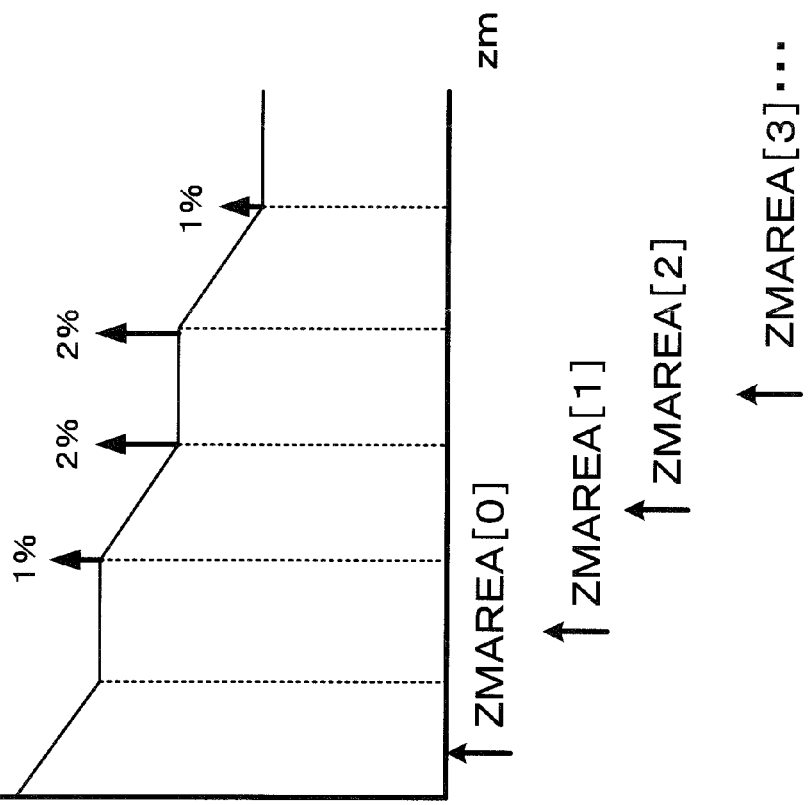
FIG. 6 is a diagram explaining the preservation of a correction amount in a camera system according to an embodiment of the present invention.

By the use of FIG. 6, the obtaining of the correction amount depending on the zoom state and the retaining of this correction amount will be explained. In the present embodiment, according to the focal length of the photographic lens 101, the zoom area is divided into eight areas; ZMAREA[0], ZMAREA[1], ZMAREA[2], ZMAREA[3], . . . . When the current focal length (zoom position zmenc) is assumed to belong to area ZMAREA[2]. Depending on the zoom state, the correction amount is updated by 2% for zoom area ZMAREA[2] including the current zoom position zmenc, and updated by 1% for zoom areas ZMAREA[1] and ZMAREA[3] neighboring this zoom area ZMAREA[2].

Further, since the correction amount varies depending on the focus lens position and a defocus area, the correction amount is retained similarly for each of these areas. Accordingly, the respective correction amounts are obtained by the learning for each lens type, each zoom area, each focus lens position, and each defocus area, and retained into the main body storage unit 207 in a table format. For example, when 20 types of lens, 20 zoom areas, 20 focus lens positions, and 20 defocus positions exist, the number of correction amounts become 20×20×20×20=160000.

Figure 7:
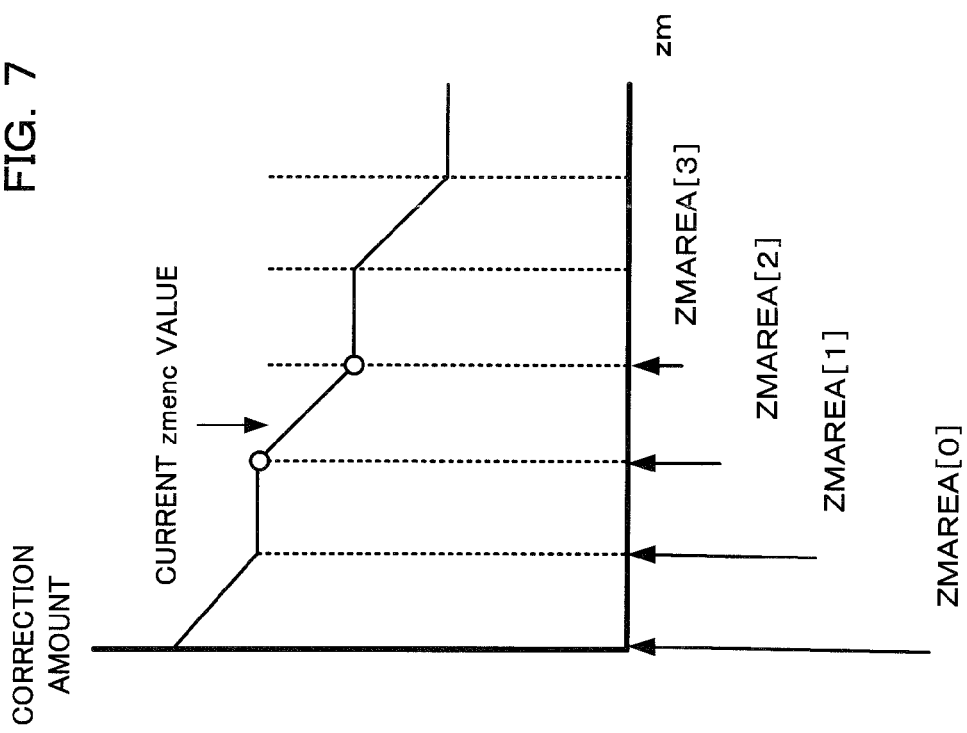
FIG. 7 is a diagram explaining a correction calculation of a conversion coefficient in a camera system according to an embodiment of the present invention.

Further, while the correction amount of the AF sensitivity (conversion coefficient) is stored in the main body storage unit 207 in a table format as above, the correction amount corresponding to the current zoom value (current zmenc value) detected by the zoom position detection unit 109 is calculated by linear interpolation by the use of the correction amount retained for each of the zoom areas (ZMAREA [ ]). The correction amount at the current zmenc value shown in FIG. 7 is calculated by following formula (5).

$$\text{Correction amount} = (\text{learn\_result}[3] - \text{learn\_result}[2]) \times (\text{zmenc} - ZMAREA[2])/(ZMAREA[3] - ZMAREA[2]) + \text{learn\_result}[2] \quad (5)$$

Here, learn_result [ ] is a correction amount obtained by the learning or stored before the learning for each of the zoom areas ZMAREA [ ].

Figure 8:
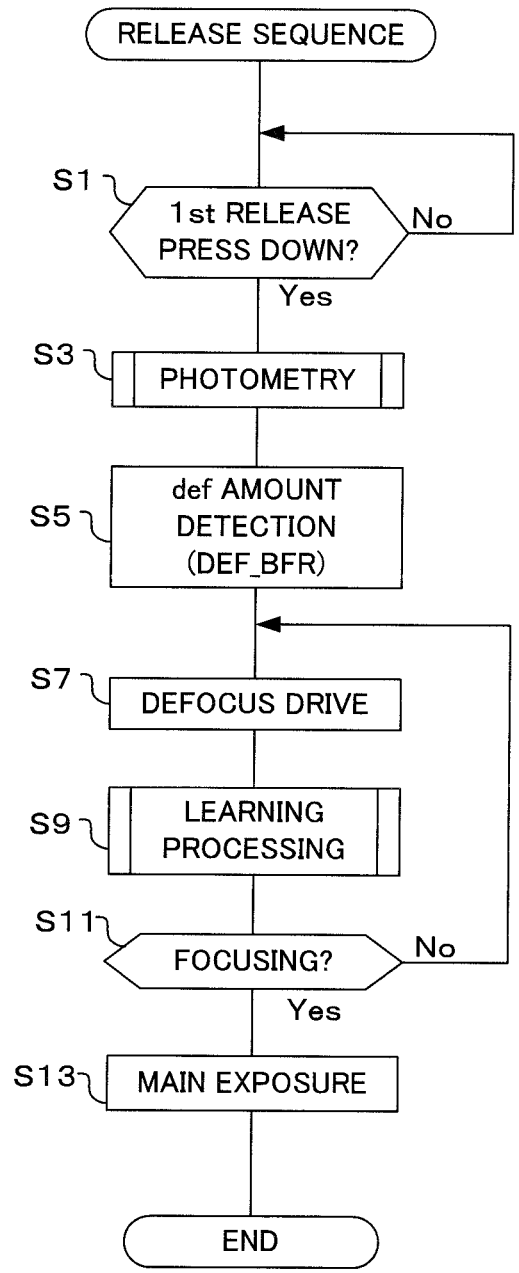
FIG. 8 is a flowchart showing the operation of a camera system according to an embodiment of the present invention.
Figure 9:
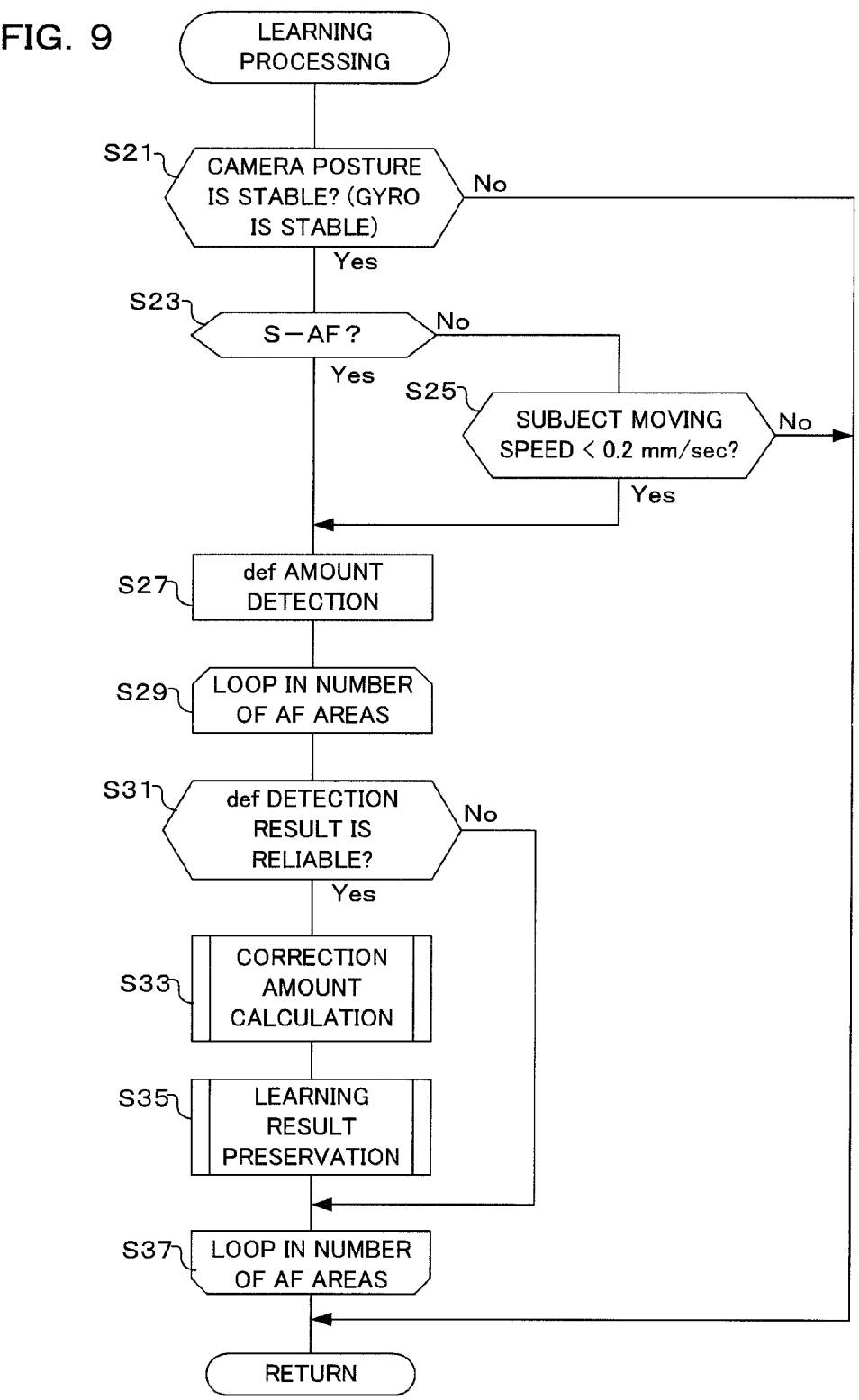
FIG. 9 is a flowchart showing the operation of learning processing in a camera system according to an embodiment of the present invention.

Next, by the use of the flowcharts shown in FIG. 8 and FIG. 9, there will be mainly explained a learning operation in the present embodiment. The flowcharts shown in FIG. 8 and FIG. 9 are executed by the CPU in the main body control unit 203 which controls each part in the camera main body 200 and the interchangeable lens 100.

Entering the flow shown in FIG. 8, first it is determined whether a first release is pressed down or not (S1). Here, the operation state of the first release switch which operates together with the half-press operation of an un-illustrated release button is input into the main body control unit 203 to be determined.

When the press-down of the first release is performed as the determination result in step S1, photometry is performed next (S3). Here, the brightness of a subject is measured using the image data readout from the imaging element 201, and an exposure control value and the like are calculated for live-view display.

After the photometry in step S3, next the detection of the defocus amount (def amount) (DEF_BFR) is performed (S5). Here, the focus detection unit 205 calculates the image phase difference information (two-image interval value) using image data from the focus detection pixel included in the image data read out from the imaging element 201 in step S3, and outputs the image phase difference information to the main body control unit 203. The main body control unit 203 calculates the defocus amount (def amount) using the input image phase difference information (two-image interval value) and the conversion coefficient (AF sensitivity value).

Further, the defocus amount calculated in step S5 corresponds to DEF_BFR(1) or DEF_BFR(2) in above FIG. 3, corresponds to DEF_BFR(3) in above FIG. 4, and corresponds to DEF_BFR(3) or DEF_BFR(3') in above FIG. 5.

After the detection of the defocus amount in step S5, defocus drive (focus lens drive according to the defocus amount) is performed (S7). Here, the main body control unit 203 transmits the calculated defocus amount to the lens control unit 105 via the communication terminal 300, and the lens control unit 105 calculates a drive amount using the input defocus amount and causes the lens drive unit 103 to perform the defocus drive of the photographic lens 101 toward the focal point.

After the defocus drive in step S7, then learning processing is performed (S9). Here, the learning is performed for optimizing the conversion coefficient (AF sensitivity) explained by the use of FIG. 2 to FIG. 5 for the individual camera system. That is, the focus detection unit 205 calculates the image phase difference information (two-image interval value) again, obtains the amount to be corrected from this image phase difference information, obtains a correction amount shown in formula (4) suitable for the individual camera system from the amount to be corrected by learning, and stores this obtained correction amount into the main body storage unit 207. While the conversion coefficient (AF sensitivity) is stored preliminarily in the main body storage unit 207, a substantial conversion coefficient (AF sensitivity) is a value corrected by the correction amount. Detailed operation of this learning processing will be described below by the use of FIG. 9.

Note that, while the learning of the correction amount is performed in the learning processing of step S9, the defocus amount calculated at this time corresponds to DEF_AFT(1) or DEF_AFT(2) in above FIG. 3, corresponds to DEF_AFT(3) in above FIG. 4, and corresponds to DEF_AFT(3) in above FIG. 5.

After the learning processing, it is determined whether focusing is performed or not (S11). Here, after the defocus drive in step S7, the focus detection is performed again by the focus detection unit 205, and it is determined whether the focusing is performed or not, from the calculated image phase difference information (two-image interval value). When the focusing is not performed as a result of this determination, the flow returns to step S7, and the defocus drive and the learning processing are performed. Every time the defocus drive is performed, the learning of the correction amount is repeated and thereby the optimum correction amount for the individual camera system is obtained finally.

Note that, in the defocus drive and the learning processing, as described above by the use of FIG. 5, the reduction amount is transmitted from the interchangeable lens 100 to the camera main body 200, and the correction according to this reduction amount is also performed. That is, the main body control unit 203 transmits the defocus amount to the lens control unit 105 via the communication terminal 300, and the lens control unit 105 calculates the movement amount of the focus lens according to the received defocus amount to move the focus lens, and transmits information about the movement amount at this time (including a reduction amount reduced from the movement amount by a predetermined amount) to the main body control unit 203, and thereby the conversion coefficient is corrected by the use of the information about this movement amount.

When the focusing is performed as the result of this determination in step S11, main exposure is performed (S13). Here, when the release button is fully pressed (2nd release press-down), the image data from the imaging element 201 is image-processed for recording and recorded on a recording medium (not shown in the drawing) in the camera main body 200. After the main exposure is finished, the present sequence is terminated.

In this manner, in the release sequence of the present embodiment, first image phase difference information is calculated by the use of the image data from the imaging element 201 (S5), and this image phase difference information is converted into the defocus amount by the use of this image phase difference information and the defocus drive is performed (S7). After this defocus drive, second image phase difference information is detected by the focus detection unit, and the conversion coefficient for the conversion into the defocus amount is corrected by learning and stored according to this second image phase difference information (S9). After the conversion coefficient is corrected by the learning, the second image phase difference information is replaced by the first image phase difference information, and second image phase difference information is detected again by the focus detection unit and the above learning is repeated. Thereby, it becomes possible to perform the correction so as to obtain an accurate conversion coefficient for the individual camera system.

Note that, since it is frequently enough for the learning processing of the conversion coefficient in step S9 to be performed only when the camera system is shipped from a factory or when a new interchangeable lens 100 is attached to the camera main body 200, the learning processing may be performed in these special cases, and, after the conversion coefficient is corrected correctly, this conversion coefficient may be detected and the learning processing may be omitted in a usual camera operation.

Next, the learning processing in step S9 will be explained by the use of the flowchart shown in FIG. 9. Entering this flow, first, it is determined whether the posture of the camera is stable or not (S21). Here, the main body control unit 203 determines of whether the posture of the camera is stable or not, according to a detection signal from the gyro 209. The determination whether the posture of the camera is stable or not is performed because the image phase difference information cannot be detected stably when the posture is not stable. When the posture of the camera is not stable as a result of this determination, the learning processing flow is terminated and the process returns to the original flow.

When the posture of the camera is stable as the result of determination in step S21, next it is determined whether single AF (S-AF) or not (S23). S-AF indicates an AF mode in which automatic focus adjustment is terminated when the photographic lens 101 comes to the focusing state. Further, continuous AF (C-AF) indicates an AF mode in which the automatic focus adjustment is continued so as to continue the focused state by tracking a moving subject, for example, even when the photographic lens 101 comes to the focusing state.

When, the AF mode is not S-AF as a result of the determination in step S23, the AF mode is C-AF mode or the like, and, in this case, next it is determined whether subject moving speed is smaller than 0.2 mm/sec or not (S25). In the case of C-AF mode or the like, since the subject can be tracked continuously and the moving speed of the subject can be detected, in this step, it is possible to determine whether the subject speed is lower than a predetermined speed or not. The moving speed of the subject is detected because it is not possible to detect the image phase difference information stably when the subject moving speed is high. When the subject moving speed is higher than 0.2 mm/sec as a result of this determination, the learning processing flow is terminated and the process returns to the original flow. Note that the predetermined speed is assumed to be 0.2 mm/sec in the present embodiment, the predetermined speed is not limited to this value if the speed is sufficient for the detection of the image phase difference information.

When the AF mode is S-AF as the result of the determination in step S23, or when the subject moving speed is lower than 0.2 mm/sec as a result of the determination in step S25, next the defocus amount is detected (S27). Here, the focus detection unit 205 calculates the image phase difference information (two-image interval value) using the image data from the focus detection pixel which is included in the image data read out from the imaging element 201, after the defocus drive in step S7, and outputs the image phase difference information to the main body control unit 203. The main body control unit 203 calculates the defocus amount from the input image phase difference information using the conversion coefficient stored in the main body storage unit 207.

After the defocus amount is calculated in step S27, next the loop processing of S29 to S37 is performed in the number of times corresponding to the number of AF areas. In the present embodiment, the focus detection pixels disposed on the imaging plane of the imaging element 201 are grouped into a plurality of AF areas. Further, as explained by the use of FIG. 4, the focus information is obtained also from the unselected AF area, and the learning of the conversion coefficient is performed on all the AF areas from which the defocus amounts are detected. Accordingly, in steps from S29 to S37, the AF area is selected sequentially, the learning is performed, and finally the learning of the conversion coefficient is performed on all the AF areas.

As a result of the determination in step S31, it is determined whether the defocus detection result has a sufficient reliability or not for the AF area selected as the target of the learning (S31). The degree of reliability of the defocus amount is determined by the use of information whether the contrast information of the pixel signal has a value smaller than a predetermined value or not, the gradient of the two-image correlation value around the minimum value of the correlation value, or the like, for example.

When the defocus detection result does not have a sufficient reliability as the result of the determination in step S31, the process proceeds to step S37 to cause the AF area to be selected as the learning target to proceed to the next, and returns to step S31.

When the defocus detection result has a sufficient reliability as the result of the determination in step S31, next the correction amount is calculated in step S33 (S33). Here, for the AF area selected as the learning target, the image phase difference information (two-image interval value) detected in step S27 is calculated, the amount to be corrected is obtained from this image phase difference information, the correction amount shown in formula (4) is learned from this amount to be corrected, and the correction amount suitable for the individual camera system is obtained.

After the calculation of the correction amount, next the learning result is retained (S35). Here, the AF area for which the calculation is performed in step S33 and the correction amount obtained for this AF area are stored into the main body storage unit 207. By the repetition of steps S29 to S37, the correction amount is stored and the corrected conversion coefficient is stored, for each of the AF areas. After the repetition of steps S29 to S37 for all the AF areas, the learning processing flow is terminated and the process returns to the original flow.

In this manner, in the learning processing flow, the correction processing is performed as explained by the use of FIG. 3 to FIG. 8 and formulas (1) to (5), and thereby the conversion coefficient is corrected (S33). Further, the degree of reliability of an image phase difference amount is calculated, and the conversion coefficient is corrected according to this degree of reliability (S31). The main body control unit 203 which functions as the focus adjustment unit corrects the conversion coefficient according to the degree of reliability of the calculated image phase difference amount (S31).

Further, the main body control unit 203 which functions as the focus adjustment unit corrects each of a plurality of conversion coefficients corresponding to each of the plurality of range-finding areas (AF areas) according to the image phase difference information corresponding to each of the plurality of range-finding areas (S29 to S37). Moreover, as explained also in FIG. 5, the conversion coefficient is corrected according to the focal length of the photographic optical system in the learning. Furthermore, the conversion coefficient is corrected according to the position of the focus lens in the photographic lens 101.

As explained above, in an embodiment of the present invention, the image phase difference information is detected by the use of the light flux having passed through the photographic optical system including the focus lens (S5 in FIG. 8), this image phase difference information is converted into the defocus amount by the conversion coefficient which converts the image phase difference information into the defocus amount (S5), and the focus lens is moved according to this defocus amount to perform the focus adjustment (S7). Then, the first image phase difference information is detected (S5), the first image phase difference information is converted into the defocus amount by the conversion coefficient (S5), and, after the focus lens is moved according to this defocus amount (S7), the second image phase difference information is detected (S27 in FIG. 9) and the conversion coefficient is corrected according to the second image phase difference information (S33). Therefore, even when variation exists among the individual focus adjustment apparatuses, it is possible to perform the correction by the learning so as to obtain an accurate conversion coefficient.

Further, in an embodiment of the present invention, the light flux having passed through the photographic lens 101 is captured to output the image signal, and also the imaging element 201 is provided having the focus detection pixel to receive the light flux obtained by pupil-dividing the light flux, and then the focus detection unit 205 detects the image phase difference information according to the output of the focus detection pixel which is output from the imaging element 201. That is, since the imaging element 201 itself includes the focus detection pixel, it is not necessary to dispose a special optical system for the pupil division, and it is possible to downsize the camera.

Further, in an embodiment of the present invention, the focus detection unit 205 calculates a degree of reliability that indicates the reliability of the image phase difference information (S31 in FIG. 9), and the main body control unit 203 which functions as the focus adjustment unit corrects the conversion coefficient according to this degree of reliability. That is, the correction of the conversion coefficient is performed by learning only when a sufficient reliability is confirmed. Therefore, it is possible to obtain the conversion coefficient having a high degree of reliability.

Further, in an embodiment of the present invention, the focus detection unit 205 has the plurality of range-finding areas within the view of the photographic optical system and detects the image phase difference information corresponding to each of the range-finding areas, and the main body control unit 203 which functions as the focus adjustment unit corrects each of the plurality of conversion coefficients corresponding to each of the plurality of range-finding areas according to the image phase difference information corresponding to each of the plurality of the range-finding areas (S29 to S37 in FIG. 9). Every time the defocus amount is detected, each of the plurality of conversion coefficients corresponding to each of the plurality of range-finding areas can be corrected, and thereby it becomes possible to correct the plurality of conversion coefficients in a short time.

Further, in an embodiment of the present invention, the photographic optical system is an optical system having a variable focal length and includes the zoom position detection unit 109 (focal length detection unit) to detect the focal length of the photographic optical system, and the main body control unit 203 corrects the conversion coefficient according to the focal length of the photographic optical system. Therefore, even when the interchangeable lens is a zoom lens, it is possible to perform the correction so as to obtain an accurate conversion coefficient corresponding to the individual variation.

Further, in an embodiment of the present invention, the main body control unit 203 which functions as the focus adjustment unit corrects the conversion coefficient according to the position of the focus lens. Therefore, even when the conversion coefficient varies according to the position of the focus lens, it is possible to perform the correction so as to obtain an accurate conversion coefficient corresponding to the individual variation.

Further, in an embodiment of the present invention, the main body control unit 203 which functions as the focus adjustment unit transmits the defocus amount to the lens control unit 105 via the lens communication unit, and the lens control unit 105 calculates the movement amount of the focus lens to move the focus lens according to the defocus amount transmitted from the main body control unit 203, and transmits the information relating to the movement amount to the main body control unit 203 via the lens communication unit, and then the main body control unit 203 corrects the conversion coefficient according to the information relating to the movement amount (refer to FIG. 5). In this manner, since the conversion coefficient is corrected in consideration of the movement amount of the focus lens in the lens control unit 105, even when the lens drive amount does not correspond one to one to the defocus amount calculated in the main body control unit 203, it is possible to perform the correction so as to obtain an accurate conversion coefficient corresponding to the individual variation.

Further, in an embodiment of the present invention, the lens control unit 105 calculates the movement amount of the focus lens according to the defocus amount transmitted from the main body control unit 203, moves the focus lens by reducing the movement amount by a predetermined amount, and transmits the reduced movement amount to the main body control unit 203 via the lens communication unit, and then the main body control unit 203 corrects the conversion coefficient according to the reduced movement amount (refer to FIG. 5) In this manner, since the conversion coefficient is corrected in consideration of the movement amount of the focus lens which is reduced in the lens control unit 105, even when the lens drive amount does not correspond, on a one-to-one basis, to the defocus amount calculated in the main body control unit 203, it is possible to perform the correction so as to obtain an accurate conversion coefficient corresponding to the individual variation.

Note that, in an embodiment of the present invention, the output of the focus detection pixel disposed in the imaging element 201 is used for obtaining the image phase difference information. However, the present invention is not limited to this case, and the light flux may be divided by a half mirror or the like, and this divided light flux may be pupil divided and the obtained light flux may be received.

Further, while, in an embodiment of the present invention, the camera system configured with the interchangeable lens 100 which is detachably attached to the camera main body 200, the present invention is not limited to this case but can be applied to a camera system of a lens-integrated type in which the photographic lens 101 is fixed to the camera main body 200.

Further, while the present embodiment is explained by the use of a digital camera as equipment for photographing, the camera may be a digital single reflex camera, a compact digital camera, a motion picture camera such as a video camera and a movie camera, and further a camera built in a mobile phone, a smart phone, a Personal Digital Assistant (PDA), a game machine, or the like. In any case, the present invention can be applied if the apparatus performs the focus adjustment of an optical lens according to the image phase difference information.

Further, among the techniques explained in the present specification, the control mainly explained in the flowcharts frequently can be set by a program and sometimes stored in a recording medium or a recording unit. For a method of recording into the recording medium or the recording unit, the recording may be performed in product shipment, a distributed recording medium may be utilized, or download through the internet may be used.

Further, although the explanation is made by the use of words to express a sequence such as "first" and "next" for convenience, in claims, the specification, or the operation flow of the drawing, it does not mean that the execution in this order is essential, in a part not explained in particular.

As understood by those having ordinary skill in the art, as used in this application, 'section,' 'unit,' 'component,' 'element,' 'module,' 'device,' 'member,' 'mechanism,' 'apparatus,' 'machine,' or 'system' may be implemented as circuitry, such as integrated circuits, application specific circuits ("ASICs"), field programmable logic arrays ("FPLAs"), etc., and/or software implemented on a processor, such as a microprocessor.

The present invention is not limited to the above embodiment as it is, and can be embodied in an implementation phase by modifying the constituent in a range without departing from the gist thereof. Further, various inventions can be formed by an appropriate combination of a plurality of constituents disclosed in the above embodiments. For example, some constituents may be omitted from all the constituents disclosed in the embodiment. Moreover, the constituents across the various embodiments may be combined.

What is claimed is:

1. A focus adjustment apparatus, comprising:
a focus detection unit to detect image phase difference information using a light flux having passed through a photographic optical system including a focus lens;
a storage unit to store a conversion coefficient for converting the image phase difference information into a defocus amount; and
a focus adjustment unit to convert the image phase difference information into the defocus amount using the conversion coefficient and to perform focus adjustment by moving the focus lens according to the defocus amount, wherein
the focus adjustment unit converts first image phase difference information detected by the focus detection unit into a first defocus amount using the conversion coefficient and causes the focus detection unit to detect second image phase difference information after having moved the focus lens according to the first defocus amount, converts the second image phase difference information into a second defocus amount using the conversion coefficient, and corrects the conversion coefficient according to the first defocus amount and the second defocus amount and causes the storage unit to store the corrected conversion coefficient.

2. The focus adjustment apparatus according to claim 1, further comprising
an imaging element to capture the light flux having passed through the photographic optical system to output an image signal, and also to include a focus detection pixel that receives a light flux obtained by pupil-dividing the light flux, wherein
the focus detection unit detects the image phase difference information using an output of the focus detection pixel which is output from the imaging element.

3. The focus adjustment apparatus according to claim 1, wherein
the focus detection unit calculates a degree of reliability indicating reliability of the image phase difference information, and
the focus adjustment unit corrects the conversion coefficient according to the degree of reliability.

4. The focus adjustment apparatus according to claim 1, wherein
the focus detection unit includes a plurality of range-finding areas in a view of the photographic optical system and detects first image phase difference information corresponding to a first range-finding area and third image phase difference information corresponding to a second range-finding area, and
the focus adjustment unit
converts the first image phase difference information and the third image phase difference information into a first defocus amount using a first conversion coefficient corresponding to the first range-finding area and into a third defocus amount using a second conversion coefficient corresponding to the second range-finding area, respectively,
causes the focus detection unit to detect fourth image phase difference information of the second range-finding area after having moved the focus lens by a movement amount according to the first defocus amount, and converts the fourth image phase difference information into a fourth defocus amount using the second conversion coefficient, and
corrects the conversion coefficient of the second range-finding area according to the third defocus amount, the fourth defocus amount, and the movement amount, and causes the storage unit to store the corrected conversion coefficient.

5. The focus adjustment apparatus according to claim 1, wherein
the photographic optical system is an optical system having a variable focal length and includes a focal length detection unit to detect a focal length of the photographic optical system, and
the focus adjustment unit corrects the conversion coefficient according to the focal length of the photographic optical system.

6. The focus adjustment apparatus according to claim 1, wherein
the focus adjustment unit corrects the conversion coefficient according to a position of the focus lens.

7. A camera system comprising an interchangeable lens having a photographic optical system and a camera main body to which the interchangeable lens can be attached,
the interchangeable lens, including:
a lens control unit to control movement of a focus lens included in the photographic optical system;
a lens storage unit to store identification information specific to the interchangeable lens; and
a lens communication unit to communicate with the camera main body, and
the camera main body, including:
a focus detection unit to detect image phase difference information using a light flux having passed through the photographic optical system,
a main body storage unit to store a conversion coefficient for converting the image phase difference information into a defocus amount in association with the identification information of the interchangeable lens,
a focus adjustment unit to select a conversion coefficient stored in the main body storage unit according to the identification information of the interchangeable lens obtained from the lens storage unit via the lens communication unit, to convert the image phase difference information into the defocus amount using the conversion coefficient, and to perform focus adjustment by causing the lens control unit to move the focus lens according to the defocus amount, wherein
the focus adjustment unit converts first image phase difference information detected by the focus detection unit into a first defocus amount using the conversion coefficient, and causes the focus detection unit to detect second image phase difference information after having moved the focus lens according to the first defocus amount, converts the second image phase difference information into a second defocus amount using the conversion coefficient, and corrects the conversion coefficient according to the first defocus amount and the second defocus amount and causes the main body storage unit to store the corrected conversion coefficient.

8. The camera system according to claim 7, wherein
the focus detection unit includes a plurality of range-finding areas in a view of the photographic optical system, and detects first image phase difference information corresponding to a first range-finding area and third image phase difference information corresponding to a second range-finding area, and
the focus adjustment unit
converts the first image phase difference information and the third image phase difference information into a first defocus amount using a first conversion coefficient corresponding to the first range-finding area and into a third defocus amount using a second conversion coefficient corresponding to the second range-finding area, respectively, causes the focus detection unit to detect fourth image phase difference information of the second range-finding area and converts the fourth image phase difference information into a fourth defocus amount using the second conversion coefficient, after having transmitted the first defocus amount to the lens control unit and caused the lens control unit to move the focus lens by a movement amount according to the first defocus amount, and corrects the conversion coefficient of the second range-finding area according to the third defocus amount, the fourth defocus amount, and information about the movement amount received after transmitted from the lens control unit and causes the storage unit to store the corrected conversion coefficient.

9. The camera system according to claim 8, wherein the lens control unit calculates the movement amount of the focus lens according to the first defocus amount transmitted from the focus adjustment unit, moves the focus lens by reducing the movement amount by a predetermined amount, and transmits the reduced movement amount to the focus adjustment unit via the lens communication unit, and the focus adjustment unit corrects the conversion coefficient of the second range-finding area according to the reduced movement amount.

10. A focus adjustment method of a focus adjustment apparatus that detects image phase difference information using a light flux having passed through a photographic optical system including a focus lens, converts the image phase difference information into a defocus amount using a conversion coefficient for converting the image phase difference information into the defocus amount, and performs focus adjustment by moving the focus lens according to the defocus amount, a focus adjustment method comprising:

detecting first image phase difference information;

converting the first image phase difference information into a first defocus amount using the conversion coefficient;

detecting second image phase difference information after having moved the focus lens according to the first defocus amount;

converting the second image phase difference information into a second defocus amount using the conversion coefficient; and correcting the conversion coefficient according to the first defocus amount and the second defocus amount.

11. The focus adjustment method according to claim 10, wherein the focus adjustment apparatus includes a plurality of range-finding areas in a view of the photographic optical system, and the focus adjustment method comprising:

detecting first image phase difference information corresponding to a first range-finding area and second image phase difference information corresponding to a second range-finding area among the plurality of range-finding areas;

converting the first image phase difference information and the second image phase difference information into a first defocus amount using a first conversion coefficient corresponding to a first range-finding area and into a second defocus amount using a second conversion coefficient corresponding to the second range-finding area, respectively;

causing the focus detection unit to detect third image phase difference information of the second range-finding area after having moved the focus lens by a movement amount according to the first defocus amount, and converting the third image phase difference information into a third defocus amount using the second conversion coefficient; and correcting the conversion coefficient corresponding to the second range-finding area according to the second defocus amount, the third defocus amount, and the movement amount.

\* \* \* \* \*